United States Patent [19]
Iida et al.

[11] Patent Number: 5,487,372
[45] Date of Patent: Jan. 30, 1996

[54] MALFUNCTIONAL DETECTING APPARATUS FOR AN ASSIST AIR CONTROL SYSTEM FOR INTERNAL COMBUSTION ENGINES

[75] Inventors: Hisashi Iida, Ama; Keiji Honjoh, Anjo, both of Japan

[73] Assignee: Nippondenso Co., Ltd., Kariya, Japan

[21] Appl. No.: 255,767

[22] Filed: Jun. 7, 1994

[30]  Foreign Application Priority Data

Jun. 8, 1993 [JP] Japan .................................. 5-137932

[51] Int. Cl.$^6$ ..................................... F02B 23/00
[52] U.S. Cl. ............................. 123/585; 123/479
[58] Field of Search .................. 73/118.1; 123/479, 123/531, 585

[56]  References Cited

U.S. PATENT DOCUMENTS 4,875,456  10/1989  Tomisawa ........................ 123/585

FOREIGN PATENT DOCUMENTS 231147   12/1984  Japan ..................................... 123/479
3217639   9/1991  Japan .
4295179  10/1992  Japan .
455255   12/1992  Japan .

Primary Examiner—Noah P. Kamen
Attorney, Agent, or Firm—Cushman, Darby & Cushman

[57]  ABSTRACT

The invention provides a malfunctional detecting apparatus for an assist air control system for internal combustion engines, which is capable of detecting malfunction such as the deterioration of the response of air control valve. A fuel injection valve is provided at downstream side of a throttle valve in an intake passage, and assist air passage is introduced into an injection port of the fuel injection valve. The assist air passage is open or closed by an air control valve which is operated in synchronism with the fuel injection valve. The assist air passage pressure sensor for detecting assist air pressure is provided in the assist air passage. The malfunction of the air control valve is judged based on the assist air pressure immediately after the air control valve is operated.

11 Claims, 9 Drawing Sheets

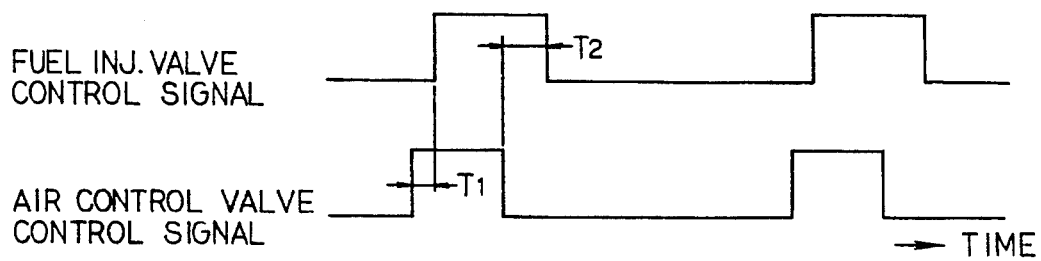
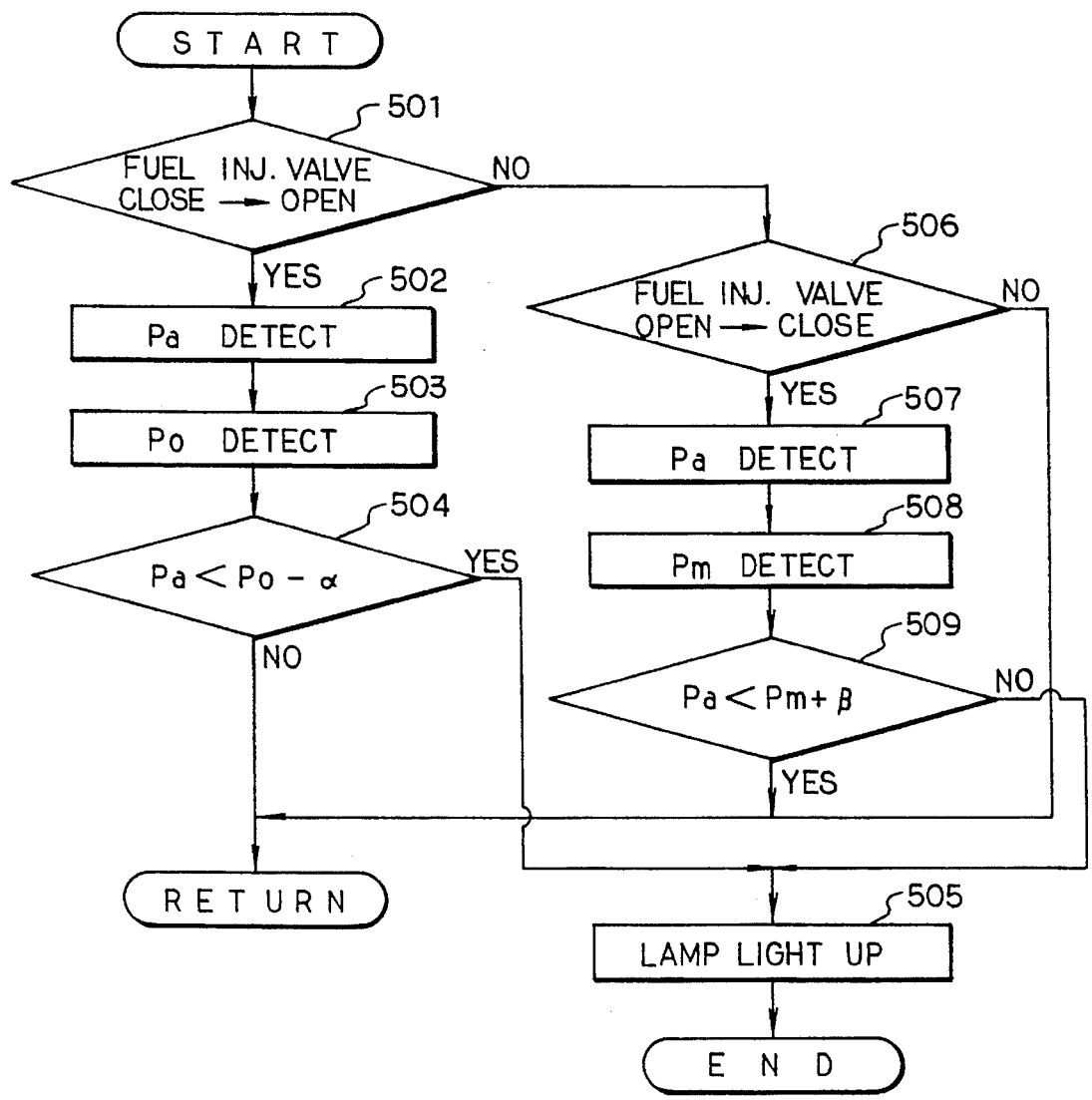

5,487,372

MALFUNCTIONAL DETECTING APPARATUS FOR AN ASSIST AIR CONTROL SYSTEM FOR INTERNAL COMBUSTION ENGINES

BACKGROUND OF THE INVENTION

1. Field of the Invention

The present invention relates to a malfunctional detecting apparatus for an assist air control system for internal combustion engines.

2. Description of the Related Art

In a conventional type of fuel injection system for internal combustion engines, the assist air is jetted against fuel to be injected in order to facilitate the atomization of the fuel, and a device for judging malfunction in this fuel injection system has been disclosed in the Japanese Examined Utility Model Publication No. 4-55255. In this malfunctional judging device, a first pressure sensor for detecting the pressure in an intake passage and a second pressure sensor for detecting the pressure in an air introduction passage are provided, and malfunction is judged when the difference in pressure between the intake passage and air introduction passage detected by the first and second pressure sensors respectively is more than the predetermined value.

For the above malfunctional detecting device for the fuel injection system for internal combustion engines, it is necessary to secure a sufficiently high response of a control valve installed in the air introduction passage. However, such malfunctional judgment, i.e., whether the response of the control valve is sufficient or not, is not performed.

SUMMARY OF THE INVENTION

Accordingly, in view of the above problem, it is an object of the present invention to provide a malfunctional detecting device for assist air control systems for internal combustion engines which is capable of detecting malfunction such as deterioration of the response of the control valve.

According to the present invention, a malfunctional detecting apparatus for an assist air control system for internal combustion engines comprises assist air passage means for defining an assist air passage having an opening toward an injection port of a fuel injection valve through which assist air passes, an air control valve disposed in the assist air passage for opening and closing the assist air passage in synchronism with the fuel injection valve, an assist air passage pressure sensor disposed in the assist air passage at the downstream side of the air control valve for detecting air pressure in the assist air passage, and malfunctional judging means for the air control valve based on assist air pressure detected by the assist air passage pressure sensor immediately after the air control valve is operated.

According to the above configuration, it is possible to detect the malfunction of the air control valve, i.e., the deterioration of the response of the air control valve or the clogging of the air injection port, based on the assist air.

BRIEF DESCRIPTION OF THE DRAWINGS

In the accompanying drawings:

FIG. 9 is a time chart of another embodiment; and

FIG. 10 is a flow chart of another embodiment.

DETAILED DESCRIPTION OF THE PREFERRED EMBODIMENTS

Referring to the attached drawings, an embodiment of the present invention embodied in an assist air control system for a fuel injection valve is described. The assist air control system for this fuel injection valve facilitates atomization of fuel by jetting assist air against fuel to be injected in synchronism with the fuel injection from a fuel injection valve.

Figure 1:
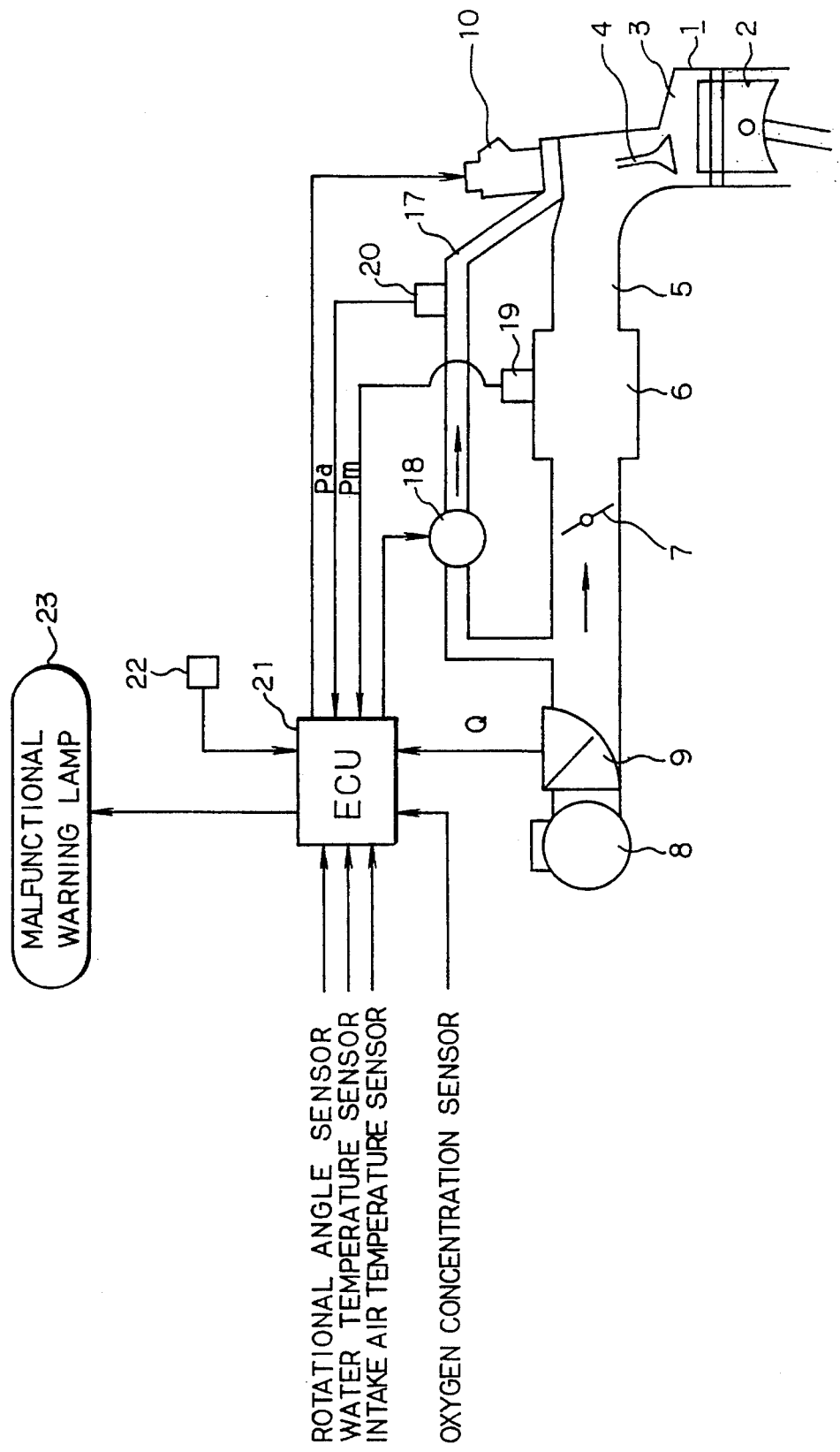
FIG. 1 is a schematic diagram of an embodiment of malfunctional detecting apparatus for an assist air control system for a fuel injection valve.

FIG. 1 shows a schematic diagram of the overall assist air control system for the fuel injection valve. In FIG. 1, a piston 2 is slidably and fittingly disposed in a cylinder bore of a cylinder block (not shown) of an engine body 1. A combustion chamber 3 is communicated with an intake passage 5 through an intake valve 4. A surge tank 6 is provided in the intake passage 5. A throttle valve 7 is provided at the upstream side of the surge tank 6. An air cleaner 8 is provided at the most upstream side in the intake passage 5. An air flowmeter 9 for measuring the flow quantity of air flowing into the intake passage 5 is provided between the air cleaner 8 and the throttle valve 7.

Figure 2:
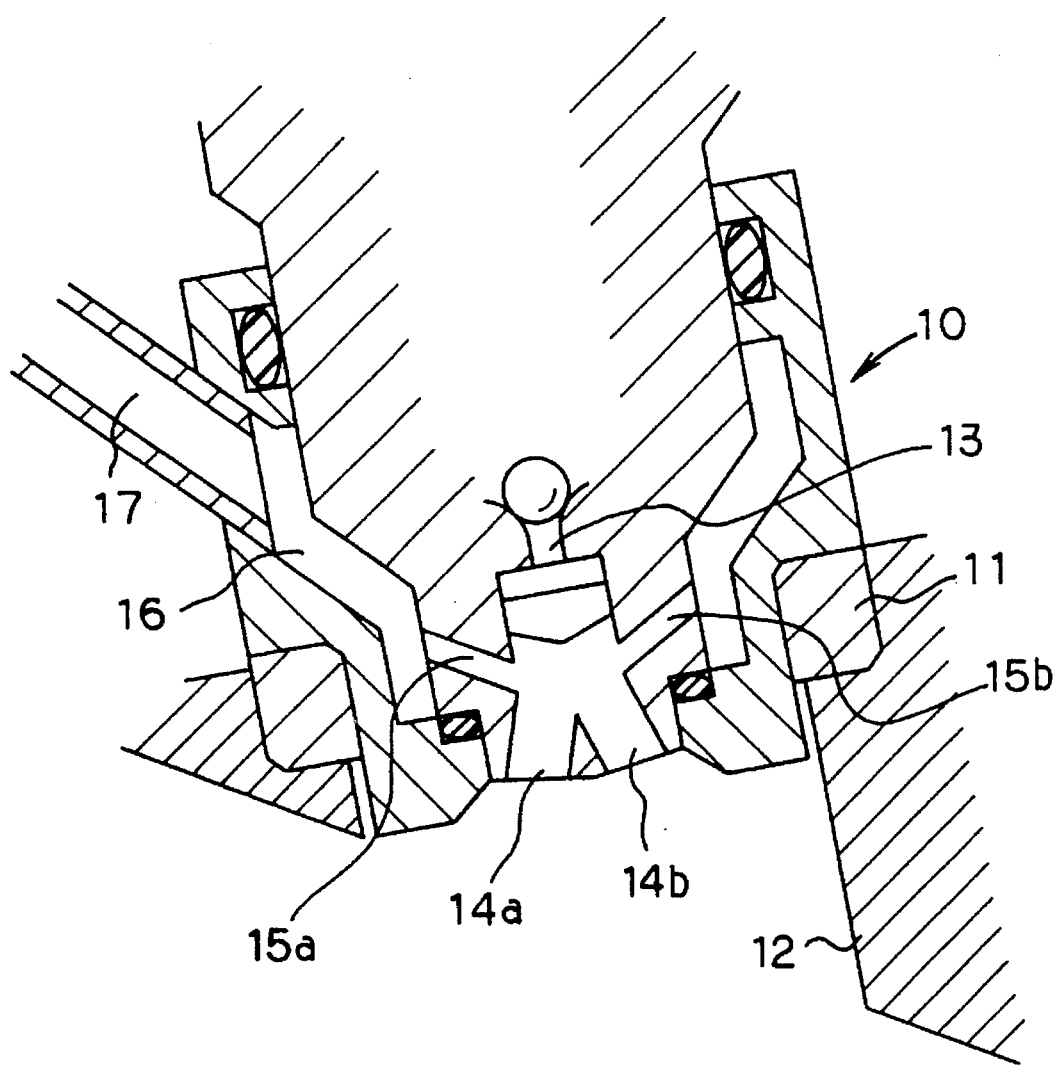
FIG. 2 is an enlarged cross-sectional view showing the tip of the fuel injection valve of the embodiment.

A fuel injection valve 10 for injecting the fuel into the combustion chamber 3 at the immediate upstream side of the intake valve 4 is provided. As shown in FIG. 2, a tip portion of the fuel injection valve 10 is fixed to the cylinder head 12 with a seal ring 11. The fuel injection valve 10 has a fuel injection port 13 for measuring the fuel quantity, and the fuel injected from the injection port 13 is divided into two different directions by injection holes 14a and 14b. The injection holes 14a and 14b are connected to an annular air induction chamber 16 through passages 15a and 15b as air jetting portions. The air induction chamber 16 is positioned at the outer periphery of the passages 15a and 16a, and connected to an assist air passage 17. Namely, the fuel injected from the fuel injection hole 13 collides with the assist air jetted from the passages 15a and 15b at the immediate downstream side of the fuel injection hole 13.

As shown in FIG. 1, the upstream end of the assist air passage 17 is connected to the intake passage 5 between the throttle valve 7 and the air flowmeter 9 through a solenoid air control valve 18. An intake passage pressure sensor 19 for detecting the absolute pressure in the intake passage 5 is provided in the surge tank 6 of the intake passage 5. Furthermore, an assist air passage pressure sensor 20 for detecting the absolute pressure in the assist air passage 17 is provided between the fuel injection valve 10 and air control valve 18 in the assist air passage 17. If the assist air passage pressure sensor 20 measures the relative pressure (gauge pressure) instead of the absolute pressure, an atmospheric pressure sensor 22 (described later) is not necessary.

The intake passage pressure sensor 19 and the assist air passage pressure sensor 20 are connected to an electronic control unit (ECU) 21 for controlling operation of the engine body 1. The air flow meter 9, a rotational angle sensor for detecting angle of the crank for the engine, a water temperature sensor for detecting temperature of cooling water for the engine, an air temperature sensor for detecting temperature of the intake air, and an oxygen concentration sensor for detecting concentration of the oxygen in the exhaust gas are connected to the ECU 21. Furthermore, an atmospheric pressure sensor 22 is also connected to the ECU 21. Namely, the pressure Pm in the intake passage 5, the pressure Pa in the assist air passage 17, the intake air quantity Q, the engine rotational speed NE, and the atmospheric pressure Po are input into the ECU 21.

On the other hand, the fuel injection valve 10 and the air control valve 18 are connected to the ECU 21, and the ECU 21 performs the injection control of the fuel injection valve 10 and the valve opening/closing control of the air control valve 18.

The ECU 21 opens the air control valve 18 and the fuel injection valve 10 at the predetermined fuel injection timing, respectively. Thus, the atomization of the fuel is facilitated by jetting the assist air from the assist air passage 17 against the fuel having been injected from the fuel injection valve 10.

The malfunctional warning lamp is also connected to the ECU 21.

The operation of the malfunctional detecting apparatus for the assist air control system for the fuel injection valve is described.

Figure 3:
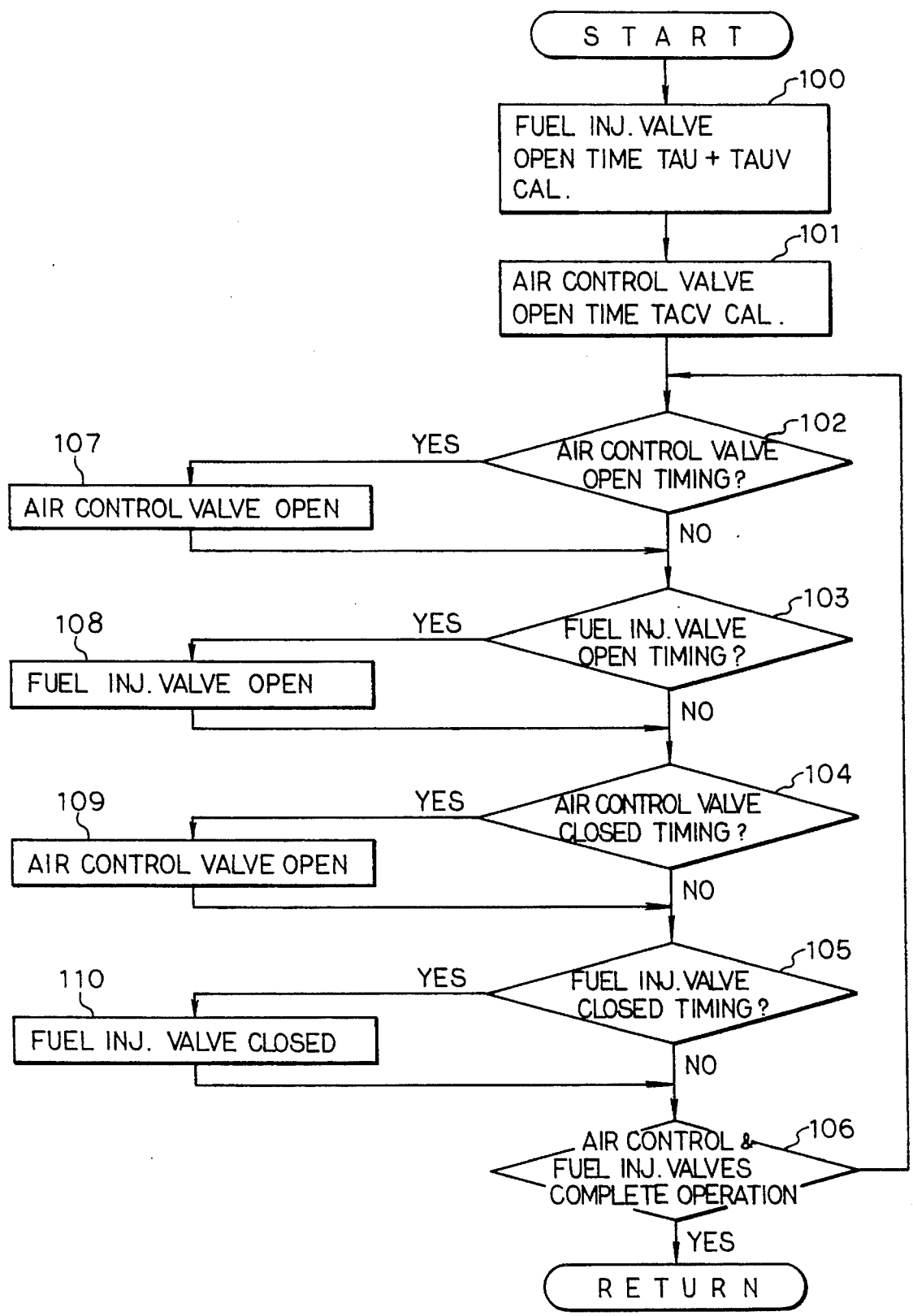
FIG. 3 is a flow chart showing the process of the embodiment.
Figure 4:
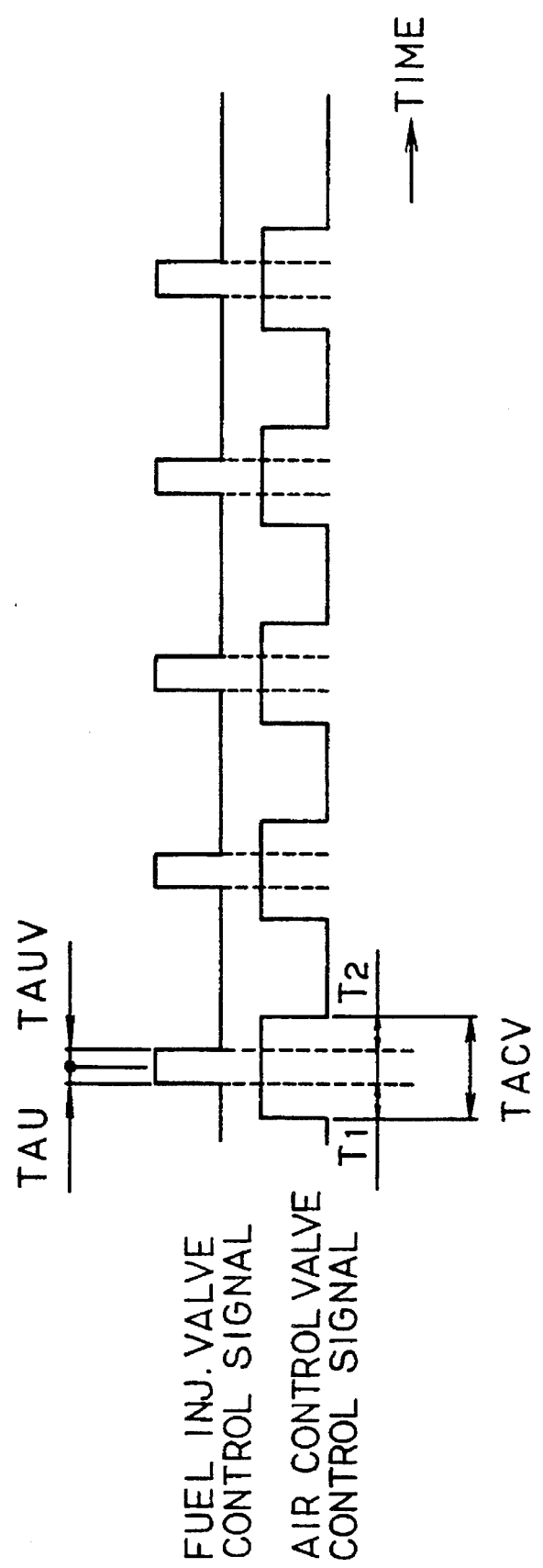
FIG. 4 is a time chart of the embodiment.

FIG. 3 is a flow chart showing the control routine performed by the ECU 21 for the control of the fuel injection valve 10 and air control valve 18. FIG. 4 is a time chart showing control signal of the fuel injection valve 10 and the air control valve 18.

The control routine shown in FIG. 3 is performed at every predetermined timing such as at every 180° crank angle. Firstly, at Step 100, the ECU 21 calculates the valve opening time for the fuel injection valve 10. Namely, the ECU 21 calculates basic injection quantity Q/Ne by dividing the intake air quantity Q measured by the air flow meter 9 by the engine rotational speed Ne detected by the rotational angle sensor. Then, the ECU 21 calculates valve opening time TAU of the fuel injection valve 10 by multiplying the basic injection quantity Q/Ne by various correction coefficients corresponding to the cooling water temperature detected by the water temperature sensor, the intake air temperature detected by the intake air temperature sensor, and the air-fuel ratio signal output from the oxygen concentration sensor. Furthermore, the ECU 21 calculates the valve opening time TAU+TAUV as the exciting time of the fuel injection valve 10 by adding ineffective injection time TAUV obtained from a map which has been prepared according to the battery voltage to the valve opening time TAU (refer to FIG. 4).

Next, at Step 101, the ECU 21 calculates the valve opening time TACV of the air control valve 18 corresponding to the fuel injection valve 10. To obtain the valve opening time TACV of the air control valve 18, the ECU 21 calculates the valve opening time TACV of the air control valve 18 by adding the rise correction time T1 indicating how much earlier the air control valve 18 should be open in advance of the valve opening timing of the fuel injection valve 10 and the fall correction time T2 indicating how much later the air control valve 18 should be closed behind the valve closing timing of the fuel injection valve 10 to the valve opening time TAU+ TAUV of the fuel injection valve 10 (refer to FIG. 4).

Then, at Step 102, the ECU 21 judges the valve opening timing of the air control valve 18, i.e., whether or not the timing in advance of the predetermined valve opening timing of the fuel injection valve 18 (e.g., BTDC 5° crank angle) by the rise correction time T1 has been fulfilled. When the ECU 21 judges that the valve opening timing of the air control valve 10 has not yet been fulfilled, the ECU 21 proceeds to Step 103 and judges whether or not the valve opening timing of the fuel injection valve 10 has been fulfilled. As described the above, as the fuel injection valve 10 constantly opens after the air control valve 18 has opened, the ECU 21 judges that the valve opening timing of the fuel injection valve has not yet been fulfilled, and proceeds to Step 104.

Next, at Step 104, the ECU 21 judges whether or not the valve closing timing of the air control valve 18 has been fulfilled. As the air control valve 18 has not yet opened, the ECU 21 judges that the valve closing timing of the air control valve 18 has not yet been fulfilled, and proceeds to Step 105. At Step 105, the ECU Judges whether or not the valve closing timing of the fuel injection valve 10 has been fulfilled. As the fuel injection valve 10 has not yet been open, the ECU 21 judges that the valve closing timing of the fuel injection valve 10 has not yet been fulfilled, and proceeds to Step 106. At Step 106, the ECU 21 judges whether or not the air control valve 18 and the fuel injection valve 10 have completed the valve opening/closing operation. As the air control valve 18 and the fuel injection valve 10 have not yet completed the valve opening/closing operation, the ECU 21 returns to Step 102 and repeatedly performs the process from Steps 102 to 106.

When the ECU 21 judges at Step 102 that the valve opening timing of the air control valve 18 has been fulfilled, the ECU 21 proceeds to Step 107 and raises the control signal to the air control valve 18 so as to open the air control valve 18. Then, the ECU 21 returns to Step 102 to repeatedly perform the process from Steps 102 to 106 again. When the rise correction time T1 has passed and the ECU 21 judges at Step 103 that the valve opening timing of the fuel injection valve 10 has been fulfilled, the ECU 21 proceeds to Step 108 and raises the control signal to the fuel injection valve 10 so as to open the fuel injection valve 10. Next, when the valve opening time TAU+TAUV has passed since the fuel injection valve 10 opened and the ECU 21 judges at Step 105 that the valve closing timing of the fuel injection valve 10 has been fulfilled, the ECU 21 proceeds to Step 110 and lowers the control signal to the fuel injection valve 10 to close the fuel injection valve 10. When the valve opening time TACV has passed since the air control valve 18 opened and the ECU 21 judges at Step 104 that the valve closing timing of the air control valve 18 has been fulfilled, the ECU 21 proceeds to Step 109 and lowers the control signal to the air control valve 18 so as to close the air control valve 18. Then, the ECU 21 judges at Step 106 that the air control valve 18 and the fuel injection valve 10 have completed the valve opening/closing operation and terminates the control routine.

Figure 5:
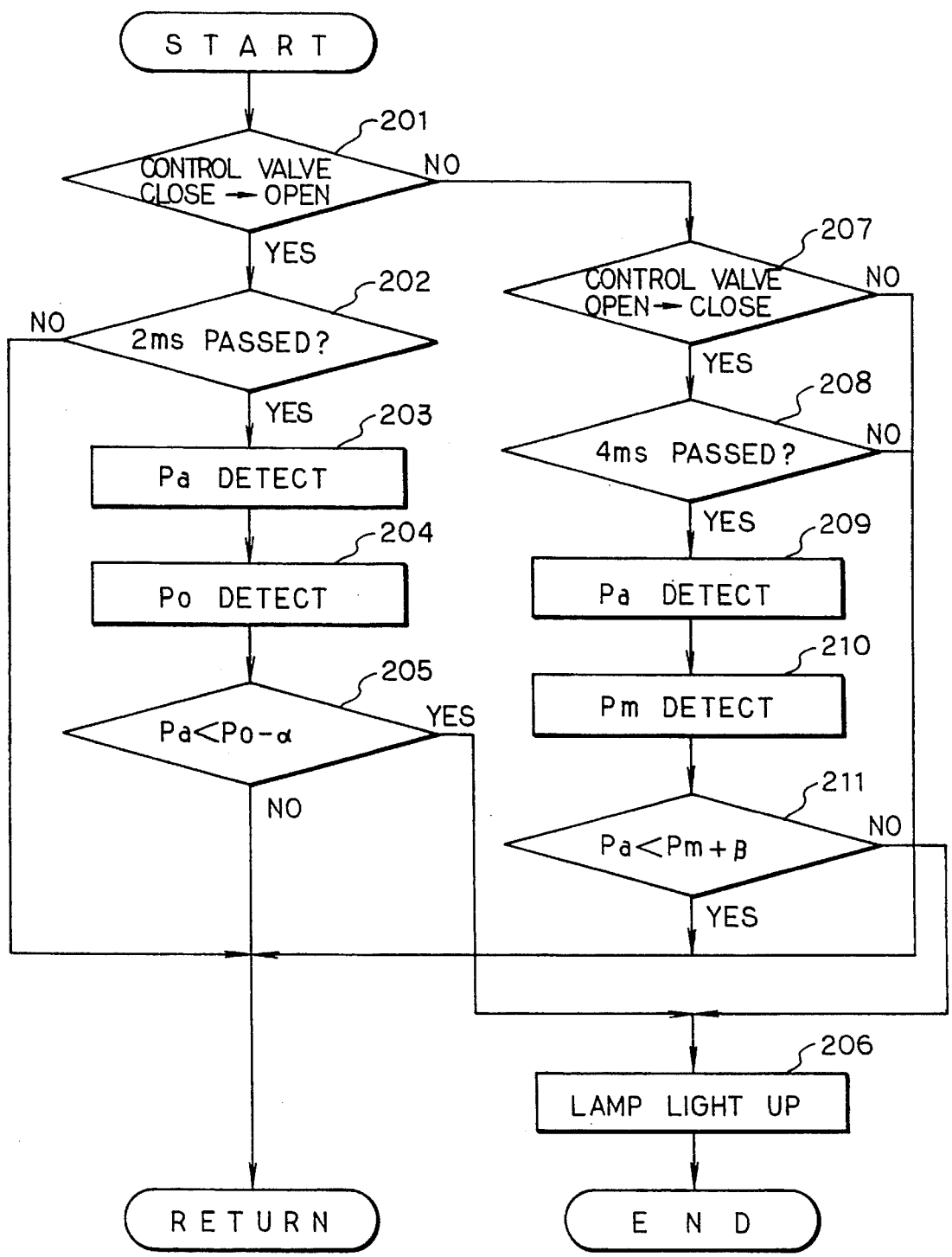
FIG. 5 is another flow chart of the embodiment.
Figure 6:
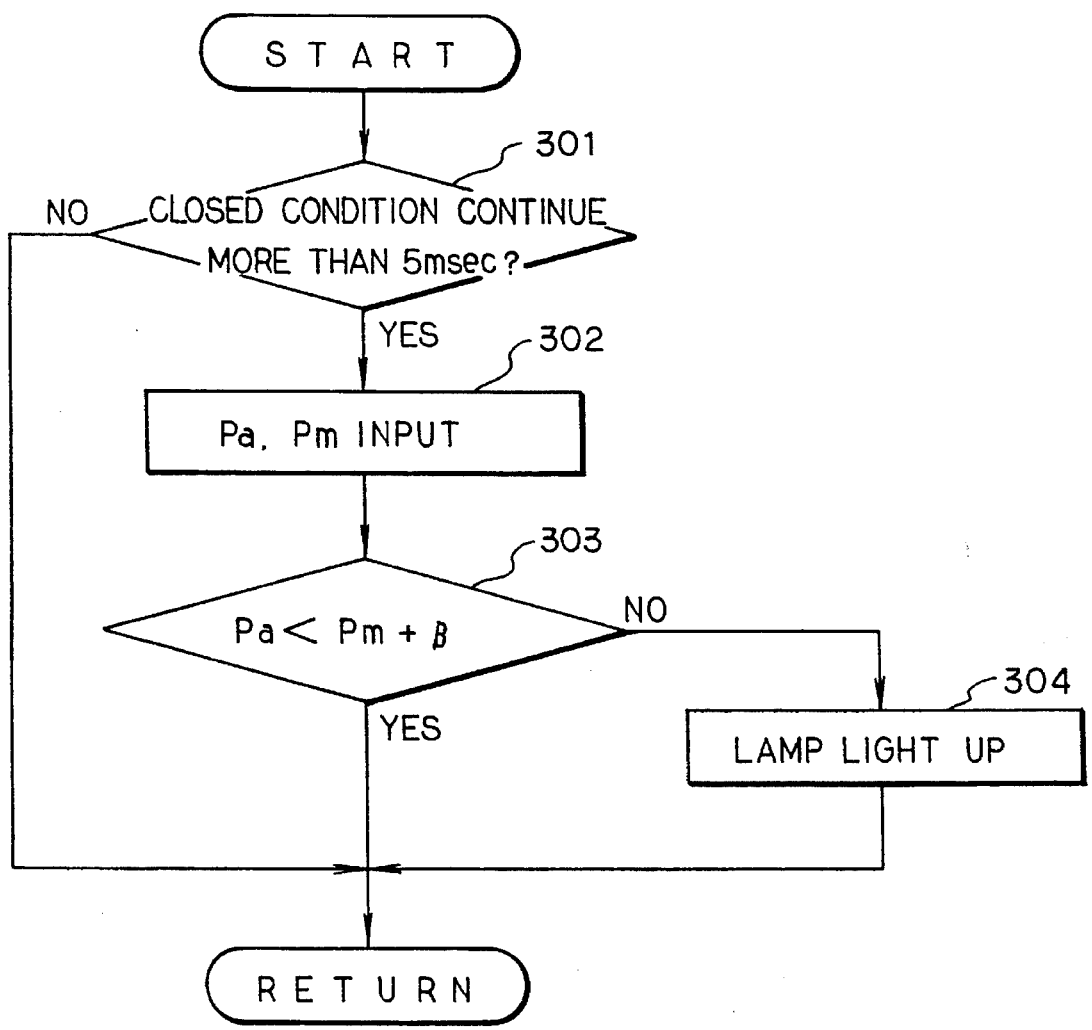
FIG. 6 is further flow chart of the embodiment.
Figure 7:
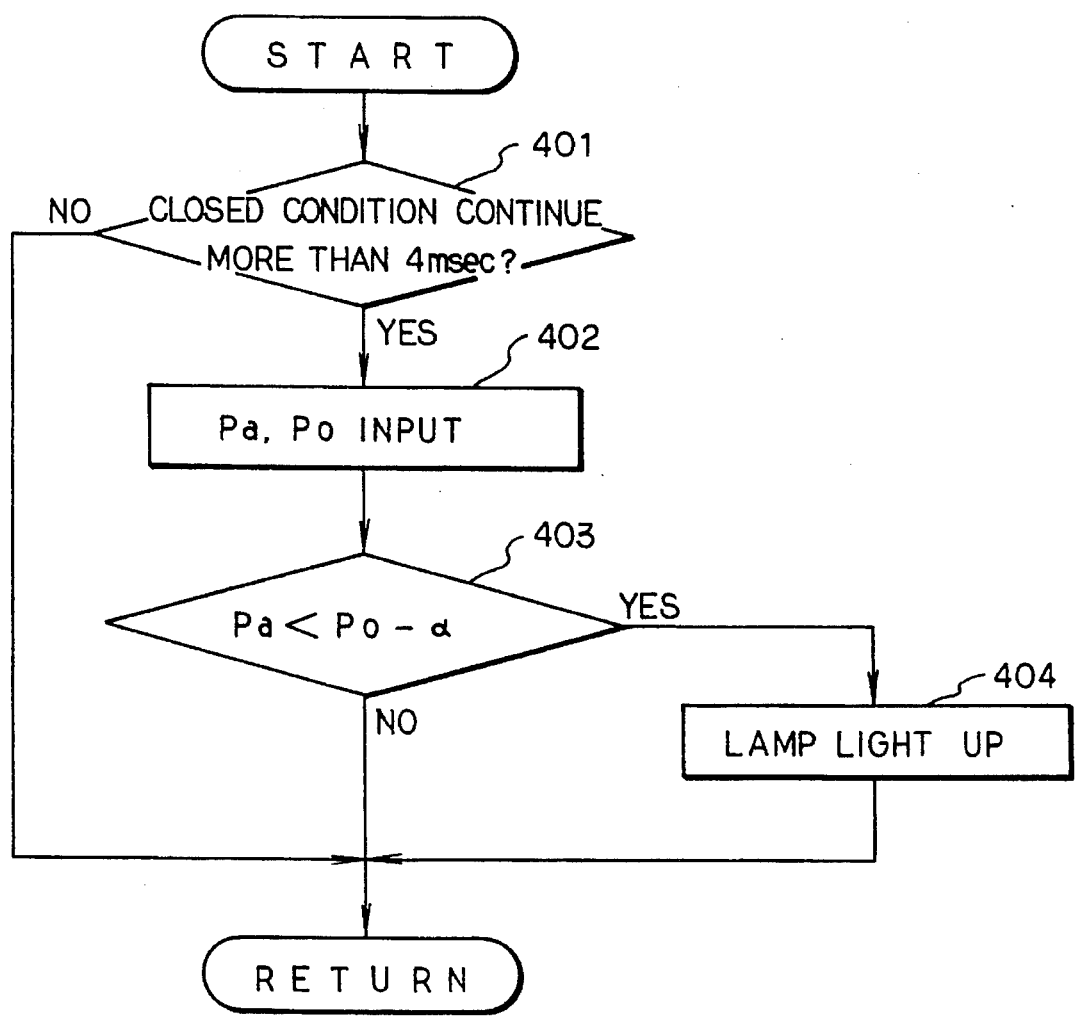
FIG. 7 is still another flow chart of the embodiment.
Figure 8:
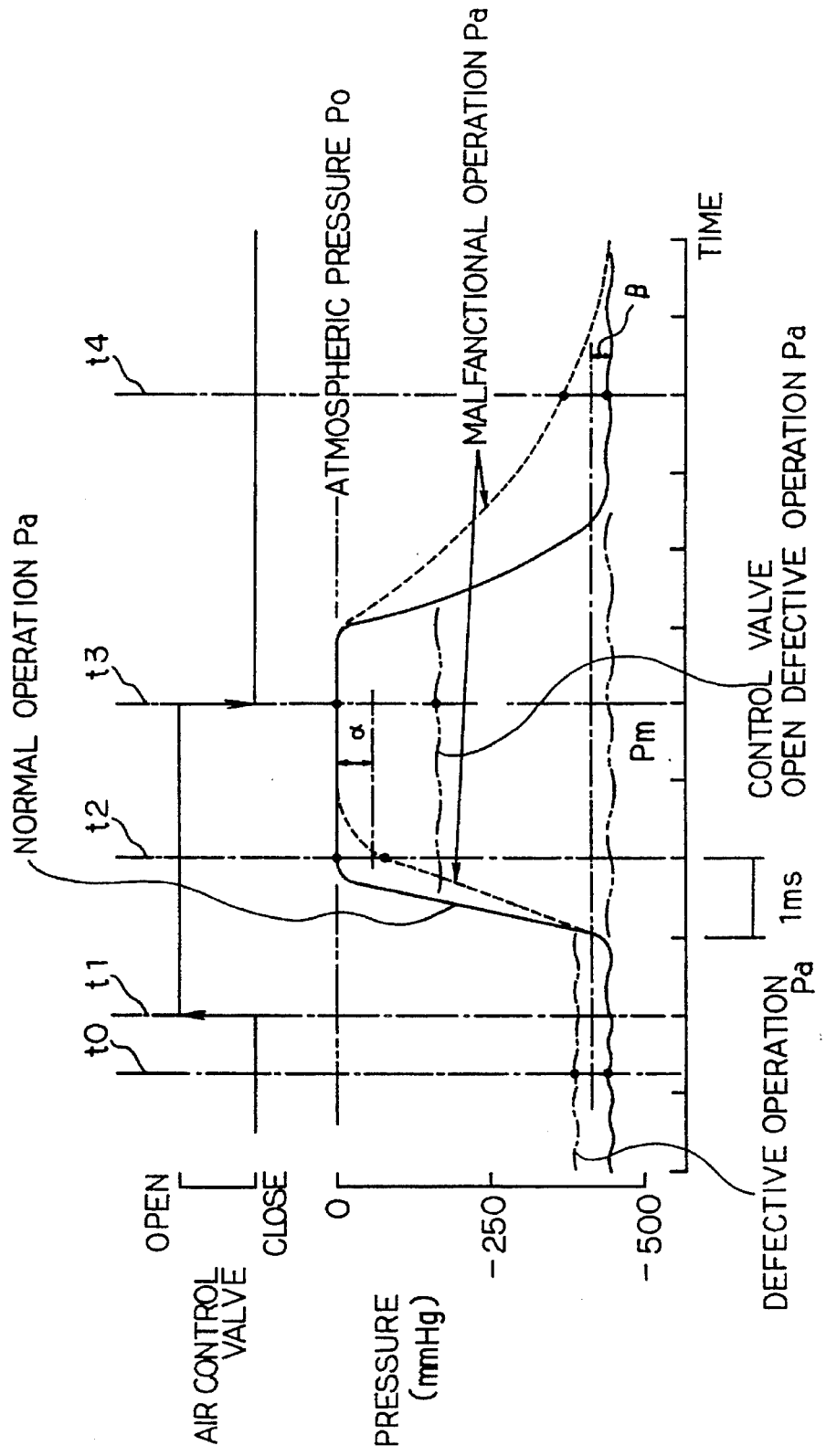
FIG. 8 is another time chart of the embodiment.

FIGS. 5 to 7 show malfunctional detection routine performed by the ECU 21, and FIG. 8 shows a time chart for the malfunctional detection process.

As shown in FIG. 5, the ECU 21 performs an interruption process at predetermined timing.

The ECU judges at Step 201 whether or not the air control valve 18 has turned from the valve closed condition to the valve open condition. When the ECU 21 judges that the air control valve 18 has turned from the valve closing condition to the valve open condition (the timing t1 in FIG. 8), the ECU 21 judges at Step 202 whether or not the predetermined time (2 msec) has passed since the air control valve 18 turned from the valve closed condition to the valve open condition. When the ECU 21 judges that the predetermined time (2 msec) has not yet passed since the air control valve 18 turned from the valve closed condition to the valve open condition, and ECU returns the routine.

When the preset time (2 msec) has passed since the air control valve 18 turned from the valve closed condition to the valve open condition (the timing t2 in FIG. 8), the ECU 21, at Step 203, detects the pressure Pa at the downstream side of the air control valve 18 in the assist air passage 17. This predetermined time of 2 msec is determined by considering the response of the air control valve 18, the throttle of the air injection port portion, and the volume of the assist air passage so that the pressure Pa in the assist air passage 17 can reliably be near the pressure at the upstream side of the throttle valve 7 in the normal operating condition.

Next, at Step 204, the ECU 21 detects the upstream pressure of the throttle valve 7, i.e., the atmospheric pressure Po. Then, the ECU 21 judges at Step 205 whether or not the air control valve 18 is in the valve open condition, i.e., whether or not the pressure Pa in the assist air passage 17 is more than the upstream pressure Po of the throttle valve 7 (atmospheric pressure) with a value $\alpha$ for preventing an erroneous judgment subtracted therefrom ($=Po-\alpha$). When the ECU 21 judges that the pressure Pa in the assist air passage 17 is more than the value ($Po-\alpha$), the ECU 21 judges that the air control valve 18 is in normal operation. Furthermore, when the ECU 21 judges that the pressure Pa in the assist air passage 17 is not more than the value ($Po-\alpha$), the ECU 21 judges that the deterioration of the response of the air control valve 18 or the clogging of the air injection port is caused, and has the malfunctional warning lamp 23 light up at Step 206.

On the other hand, when the ECU 21 judges at Step 201 that the air control valve 18 has not turned from the valve closed condition to the valve open condition, the ECU 21 proceeds to Step 207 and judges whether or not the air control valve 18 has turned from the valve open condition to the valve closed condition. When the ECU 21 judges that the air control valve 18 has turned from the valve open condition to the valve closed condition (the timing t3 in FIG. 8), the ECU 21 proceeds to Step 208 and judges whether or not predetermined time (4 msec) has passed since the air control valve 18 turned to the valve closed condition. When the ECU 21 judges that the predetermined time (4 msec) has passed since the air control valve 18 turned from the valve open condition to the valve closed condition, the ECU 21 returns the routine.

When the ECU 21 judges that the predetermined time (4 msec) has passed since the air control valve 18 turned from the valve open condition to the valve closed condition (the timing t4 in FIG. 8), the ECU 21 proceeds to Step 209 and detects the pressure Pa in the assist air passage 17. This predetermined time of 4 msec is determined by considering the response of the air control valve 18, the throttle of the air injection port, and the volume of the assist air passage so that the pressure Pa in the assist air passage 17 can reliably be near the pressure Pm in the intake passage 5.

Then, at Step 210, the ECU 21 detects the pressure Pm in the surge tank 6 of the intake passage 15. Subsequently, the ECU 21 judges at Step 211 whether or not the air control valve 18 is in the valve closed condition, i.e., whether or not the pressure Pa in the assist air passage 17 is less than the pressure Pm in the intake passage 5 with a value $\beta$ for preventing an erroneous judgment added ($=Pm+\beta$). When the ECU 21 judges that the pressure Pa in the assist air passage 17 is less than the value ($Pm+\beta$), the ECU 21 judges that the air control valve 18 is in normal operation. When the ECU 21 judges that the pressure Pa in the assist air passage 17 is not less than the value ($Pm+\beta$), the ECU 21 judges that the deterioration of the response of the air control valve 18 or the clogging of the air injection port is caused, and has the malfunctional warning lamp 23 light up at Step 206.

On the other hand, the ECU 21 performs the process shown in FIG. 6 at every predetermined time.

Firstly, at Step 301, the ECU 21 judges whether or not the valve closed condition of the air control valve 18 has continued for more than the predetermined time (5 msec). When the ECU 21 judges that the valve closed condition of the air control valve 18 has continued for more than the predetermined time (5 msec) (e.g., the timing t0 in FIG. 8), the ECU 21 proceeds to Step 302 and detects the pressure Pa in the assist air passage 17, and the pressure Pm in the intake passage 5. Furthermore, the ECU 21 judges at Step 303 whether or not the air control valve 18 is in the valve closed condition, i.e., whether or not the pressure Pa in the assist air passage 17, is less than the pressure Pm in the intake passage 5, with a value $\beta$ for preventing an erroneous judgment added ($=Pm+\beta$). When the ECU 21 judges that the pressure Pa in the assist air passage 17 is less than the value ($Pm+\beta$), the ECU 21 judges that the air control valve 18 is in normal operation. When the ECU 21 judges that the pressure Pa in the assist air passage 17 is not less than the value ($Pm+\beta$), the ECU 21 judges that air is leaking from the assist air passage 17 or from the air control valve 18, and has the malfunctional warning lamp 23 light up at Step 304.

The ECU 21 also performs the process shown in FIG. 7 at every predetermined time.

Firstly, at Step 401, the ECU 21 judges whether or not the valve open condition of the air control valve 18 has continued for more than a predetermined time (4 msec). When the ECU 21 judges that the valve open condition of the air control valve 18 has continued for more than the predetermined time (4 msec) (e.g., the timing t3 in FIG. 8), the ECU 21 proceeds to Step 402 and detects the pressure Pa in the assist air passage 17 and the upstream pressure of the throttle valve 7, i.e., the atmospheric pressure Po. Then, the ECU 21 judges at Step 403 whether or not the air control valve 18 is in the valve open condition, i.e., whether or not the pressure Pa in the assist air passage 17 is more than the upstream pressure of the throttle valve 7, i.e., the atmospheric pressure Po, with a value $\alpha$ for preventing an erroneous judgment subtracted ($Po-\alpha$). When the ECU 21 judges that the pressure Pa in the assist air passage 17 is more than the value ($Po-\alpha$), the ECU 21 judges that the air control valve 18 is in normal operation. When the ECU 21 judges that the pressure Pa in the assist air passage 17 is not more than the value ($Po-\alpha$), the ECU 21 judges that the opening of the air control valve opening 18 is defective in opening (incomplete full opening), and has the malfunctional warning lamp 23 light up at Step 404.

As described the above, in this embodiment, the assist air passage pressure sensor 20 is provided at the downstream side of the air control valve 18 in the assist air passage 17 in order to detect the pressure in the assist air passage 17. The ECU 21 (malfunctional judging means) is provided in order to judge malfunction, such as the deterioration of the response of the air control valve 18 and the clogging of the air injection port, based on the pressure Pa in the assist air passage 17, detected by the assist air passage pressure sensor 20 when the air control valve 18 is in the valve opening/ closing operation (Step 205 or 211 in FIG. 5). Accordingly, the malfunctions such as the deterioration of the response of the air control valve 18 or the clogging of the air injection port, can be detected with a high precision.

According to the flow chart in FIG. 3, in case that the air control valve control signal for opening instruction is generated at predetermined time T1 before the fuel injection valve control signal for opening instruction, and the air control valve control signal for closing instruction is generated at predetermined time T2 the before fuel injection valve control signal for closing instruction as shown in FIG. 9, ECU 21 performs the malfunctional judgement at opening timing and closing timing of fuel injection valve control signal according to the flow chart shown in FIG. 10 instead of the flow chart shown in FIG. 5. Namely, in FIG. 10, at Step 501, when ECU 21 judges that fuel injection valve 10 has turned from the closed position to the open position, the ECU 21 proceeds to Step 502 and detects the pressure Pa in the assist air passage 17. Then, the ECU 21 proceeds to Step 503 and detects the atmospheric pressure Po, and judges whether the pressure Pa in the assist air passage 17 is not less than the value (Po–α). When ECU 21 judges that the pressure Pa is less than the value (Po–α), it has the malfunctional warning lamp 23 light up. On the other hand, when ECU 21 judges that the fuel injection valve 10 has not turned from the open position to the closed position at Step 506, it proceeds to Step 507 and detects the pressure Pa in the assist air passage 17. Then, at Step 508, ECU 21 detects the intake pressure Pa, and judges whether the pressure Pa in the assist air passage 17 is not more than the value (Pa+β) in the intake passage 5 at Step 509. When ECU 21 judges that the pressure Pa in the assist air passage 17 is more than the value (Pa+β), the ECU 21 proceeds to Step 505 and has the malfunctional warning lamp 23 light up.

As described above, according to the present invention, the malfunction such as the deterioration of the response of the control valve such can be detected with high precision.

Although the above embodiments of the present invention has been described herein, it should be apparent that the present invention may be embodied in many other forms without departing from the spirit or the scope of the invention.

What is claimed is:

1. A malfunctional detecting apparatus for an assist air control system for internal combustion engines comprising:

a fuel injection valve for injecting fuel from an injection port thereof into an intake passage at downstream side of a throttle valve;

assist air passage means for defining an assist air passage having an opening toward said injection port of said fuel injection valve through which assist air passes;

an air control valve disposed in said assist air passage for being operated to open and close said assist air passage;

control means for controlling quantity of air to be introduced into said opening of said assist air passage by opening and closing said air control valve in synchronism with said fuel injection valve;

an assist air passage pressure sensor disposed in said assist air passage at downstream side of said air control valve for detecting air pressure in said assist air passage; and malfunctional judging means for said air control valve based on air pressure detected by said assist air passage pressure sensor immediate after said air control valve is operated.

2. A malfunctional detecting apparatus according to claim 1, said malfunctional judging means includes a malfunctional warning lamp.

3. A malfunctional detecting apparatus according to claim 1, further comprising:

an atmospheric pressure sensor for detecting atmospheric pressure; wherein atmospheric pressure in said intake passage at upstream side of said throttle valve is introduced into said assist air passage and said malfunctional judging means includes open timing judging means which judges malfunction of said air control valve when difference between said assist air pressure predetermined time after said air control valve turn from closed position to open position detected by said assist air passage pressure sensor and said atmospheric pressure detected by said atmospheric pressure sensor is equal to or more than a predetermined value.

4. A malfunctional detecting apparatus according to claim 3, said predetermined time of said open timing judging means is determined to be shorter than period of next timing that said air control valve is closed by said control means.

5. A malfunctional detecting apparatus according to claim 3, further comprising:

an intake pressure sensor for detecting an intake pressure in said intake passage; wherein said malfunctional judging means includes closed timing judging means which judges malfunction of said air control valve when difference between said assist air pressure predetermined time after said air control valve turn from open position to closed position detected by said assist air passage pressure sensor and said intake pressure detected by said intake pressure sensor is equal to or more than a predetermined value.

6. A malfunctional detecting apparatus according to claim 5, wherein said predetermined time of said closed timing judging means is determined to be longer than that of said open timing judging means.

7. A malfunctional detecting apparatus according to claim 6, said predetermined time of said open timing judging means is determined to be shorter than period of next timing that said air control valve is closed by said control means and said predetermined time of said closed timing judging means is determined to be shorter than period of next timing that said air control valve is open by said control means.

8. A malfunctional detecting apparatus according to claim 5, said predetermined time of said open timing judging means is determined to be shorter than period of next timing that said air control valve is closed by said control means and said predetermined time of said closed timing judging means is determined to be shorter than period of next timing that said air control valve is open by said control means.

9. A malfunctional detecting apparatus according to claim 5, wherein said air control valve is controlled by said control means so as to be open predetermined time before said fuel injection valve is open and be closed predetermined time before said fuel injection valve is closed, said open timing judging means judges malfunction of said air control valve when said fuel injection valve is open, and said closed timing judging means judges malfunction of said air control valve when said fuel injection valve is closed.

10. A malfunctional detecting apparatus according to claim 1, further comprising:

an intake pressure sensor for detecting an intake pressure in said intake passage; wherein said malfunctional judging means includes closed timing judging means which judges malfunction of said air control valve when difference between said assist air pressure predetermined time after said air control valve turn from open position to closed position detected by said assist air passage pressure sensor and said intake pressure detected by said intake pressure sensor is equal to or more than a predetermined value.

11. A malfunctional detecting apparatus according to claim 10, said predetermined time of said closed timing judging means is determined to be shorter than period of next timing that said air control valve is open by said control means.

* * * * *